(12) United States Patent
Johnson (10) Patent No.: US 6,963,857 B1
(45) Date of Patent: Nov. 8, 2005

(54) NETWORK-ACCESSIBLE ACCOUNT SYSTEM

(75) Inventor: David Matthew Johnson, Boston, MA (US)

(73) Assignee: JSA Technologies, Fort Worth, TX (US)

( * ) Notice: Subject to any disclaimer, the term of this patent is extended or adjusted under 35 U.S.C. 154(b) by 0 days.

(21) Appl. No.: 09/358,196

(22) Filed: Jul. 12, 1999

(51) Int. Cl.$^7$ .............................................. G06F 17/60
(52) U.S. Cl. ............................ 705/39; 705/35; 705/41
(58) Field of Search ............................ 705/35, 39, 41; 380/24, 33

(56) References Cited

U.S. PATENT DOCUMENTS

| | | | |
|---|---|---|---|
| 5,745,886 A | 4/1998 | Rosen | 750/39 |
| 5,778,067 A | 7/1998 | Jones et al. | 308/24 |
| 5,832,453 A | 11/1998 | O'Brien | 705/6 |
| 5,884,288 A | 3/1999 | Chang et al. | 705/40 |
| 5,903,880 A | 5/1999 | Biffar | 705/39 |
| 5,905,976 A | 5/1999 | Mjolsnes et al. | 705/39 |
| 5,915,023 A | 6/1999 | Bernstein | 380/24 |
| 5,920,629 A | 7/1999 | Rosen | 380/24 |
| 5,920,847 A | 7/1999 | Kolling et al. | 705/40 |

OTHER PUBLICATIONS

The Campus Card Conundrum, Feb. 1998, Card Technology.*

* cited by examiner

Primary Examiner—Richard Weisberger
(74) Attorney, Agent, or Firm—McGuireWoods LLP (57) ABSTRACT

The present invention is directed to methods of, and systems for, allowing an account participant to add value via a wide-area network to a first account from a second account. A first account server coupled to a wide-area network supports the first account. In a preferred embodiment the wide-area-network-accessible value transfer station (VTS) includes a central processing unit for executing instructions, and a memory unit. The memory unit includes an operating system, software for receiving from a participant via the network a) second account identification information, and b) a value that the participant desires to transfer to the first account from the second account, second account verification software for receiving the second account identification number from said receiving software and for verifying that the second account authorizes the transfer of the specified value, and value transfer software for receiving a value from the receiving software, for receiving a verification from the verification software, and for transferring the specified value to the first account from the second account if the verification is received. The wide-area-network-accessible VTS further includes conductive interconnects connecting the central processing unit and the memory unit to allow portions of the wide-area-network-accessible value transfer station to communicate and to allow the central processing unit to execute the software in the memory unit.

29 Claims, 9 Drawing Sheets

TECHNOLOGIES

JSA TECH. IN IT'S CONTINUING COMMITMENT TO EXCELLENCE THROUGH THE USE OF LEADING EDGE TECHNOLOGY, HAS DEVELOPED THIS SITE FOR THE CONVENIENCE OF OUR ESTEEMED STUDENTS, PARENTS AND FACULTY.

THROUGH THIS SITE, ANY JSA-ONE-CARD HOLDER CAN TRANSFER FUNDS ONTO THE JSA-ONE-CARD, OR OBTAIN BALANCE AND ACCOUNT INFORMATION. THE JSA-ONE-CARD IS OUR UNIVERSITIES "FRONT END" TO AN IDENTIFICATION CARD SYSTEM. THIS WEB SERVER DOES NOT REPLACE ANY IDENTIFICATION CARD SYSTEM SOFTWARE, BUT IS AN "ADD ON" TO YOUR EXISTING SYSTEM. NO CONFIGURATION BEYOND CREATING A NEW USER ON YOUR IDENTIFICATION CARD IS REQUIRED BY YOUR SCHOOL.

| I AM USING A BROWSER CAPABLE OF USING SSL TECHNOLOGY FOR SECURELY TRANSMITTING INFORMATION OVER THE INTERNET. | MY BROWSER IS NOT CAPABLE OF USING SSL TECHNOLOGY BUT I WILL PROCEED ANYWAY UNDERSTANDING THE RISKS INVOLVED. |
|---|---|
| ENTER SECURE SITE | ENTER NON-SECURE SITE |

COPYRIGHT 1998 BY JSA TECHNOLOGIES INC.

JSA TECHNOLOGIES INC.
PHONE: 879.JSA.TECH/879.572.8324
HOME | CONTACT US | CONTACT US | ORDER | INDEX | E-MAIL

JSA TECH SERVICES AUTHENTICATION
YOUR ACCESS HAS BEEN VERIFIED

YOUR JSA-ONE-CARD ACCOUNT HAS BEEN VERIFIED.

CREDIT CARD TYPE: -SELECT-
CREDIT CARD NUMBER:
EXPIRATION MONTH: -SELECT-
EXPIRATION YEAR: -SELECT-
US DOLLAR AMOUNT $ -SELECT-

CONTINUE

COPYRIGHT 1998 BY JSA TECHNOLOGIES INC.

JSA TECHNOLOGIES INC.
PHONE: 879.JSA.TECH/879.572.8324
HOME | CONTACT US | CONTACT US | ORDER | INDEX | E-MAIL

FIG. 9

NETWORK-ACCESSIBLE ACCOUNT SYSTEM

COPYRIGHT NOTICE

Copyright, 1998, 1999, JSA Technologies, Incorporated. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to a wide-area-network-accessible (WAN-accessible) account system and, more particularly, to a system for allowing an account participant to access a account, e.g., to transfer value to a first account from a second account, via a device attached to a WAN.

Single card account systems, such as university identification card systems, perform a variety of useful functions. In the university context, a university community member can use their identification card for identification and for facilities access. Importantly, a cardholder can also use their card purchase products and/or services from a variety of sources such as copying machines, vending machines, dining services, the university book store, library services, and athletic department services. Other institutions such as large companies can use a single card account system in a similar way.

However, universities and other institutions presently provide staff, office space, and facilities to assist community members in depositing money into a particular account. Furthermore, community members typically submit their money during business hours or use regular mail. As a result there is often a significant lag between the first occurrence of a desire to add a specified amount to a particular account and the crediting of that specified amount to the particular account.

For the foregoing reasons, it is an object of the invention to provide a value transfer system that allows an authorized community member greater access to the community's single card system. It is another object of the invention to provide ubiquitous or global access (e.g., from a variety of personal computers and other personal digital assistants connected to the Internet) to a value transfer system. It is still another object of the invention to provide access to a community's value transfer system twenty-four-hours-a-day, three-hundred-sixty-five-days-a-year. Further, it is another object of the invention to provide cardholders instant access to their deposited funds.

Other objects of the invention will in part be obvious and will in part appear hereinafter.

SUMMARY OF THE INVENTION

The present invention is directed to WAN-accessible systems for allowing an account participant to access an account system, e.g., to add value to a first account from a second account. A first account server coupled to a network supports the first account. One version of a system according to the invention includes a WAN-accessible value transfer station (VTS) coupled to the network and coupled to the first account server. The WAN-accessible VTS includes: 1) a module for receiving from a participant a) second account identification information, and b) a value that the participant desires to transfer to the first account from the second account; 2) a module for verifying that the second account authorizes the transfer of the value; and 3) a module for transferring the value to the first account from the second account.

In a preferred embodiment the WAN-accessible VTS includes a central processing unit for executing instructions, and a memory unit. The memory unit includes: 1) an operating system; 2) software for receiving from a participant via the network a) second account identification information, and b) a value that the participant desires to transfer to the first account from the second account; 3) second account verification software for receiving the second account identification information from the receiving software and for verifying that the second account authorizes the transfer of the value; and 4) value transfer software for receiving a specified value from the receiving software, for receiving a verification from the verification software, and for transferring the value to the first account from the second account if the verification is received. The WAN-accessible VTS further includes conductive interconnects connecting the central processing unit and the memory to allow portions of the WAN-accessible VTS to communicate and to allow the central processing unit to execute the software in the memory unit.

Another version of the invention provides a method, performed in a server, of adding value to a first account by transferring value from a second account. The method includes the steps of: 1) receiving from a participant via the network a) account identification information for identifying a second account, and b) a value that the participant desires to transfer to the first account from the second account; 2) verifying that the second account authorizes the transfer of the value; and 3) transferring the value to the first account from the second account.

Yet another version of the invention provides a computer data signal embodied in a carrier wave. The computer data signal includes program code which allows for a card account participant to remotely add value to a first account from a second account. A first account server coupled to a network supports a first account. The program code includes software for receiving from a participant a) first account identification information, b) second account identification information, and c) a value that the participant desires to transfer to the first account from the second account, second account verification software for verifying that the second account authorizes the transfer of the specified value, and value transfer software for transferring the specified value to the first account from the second account.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
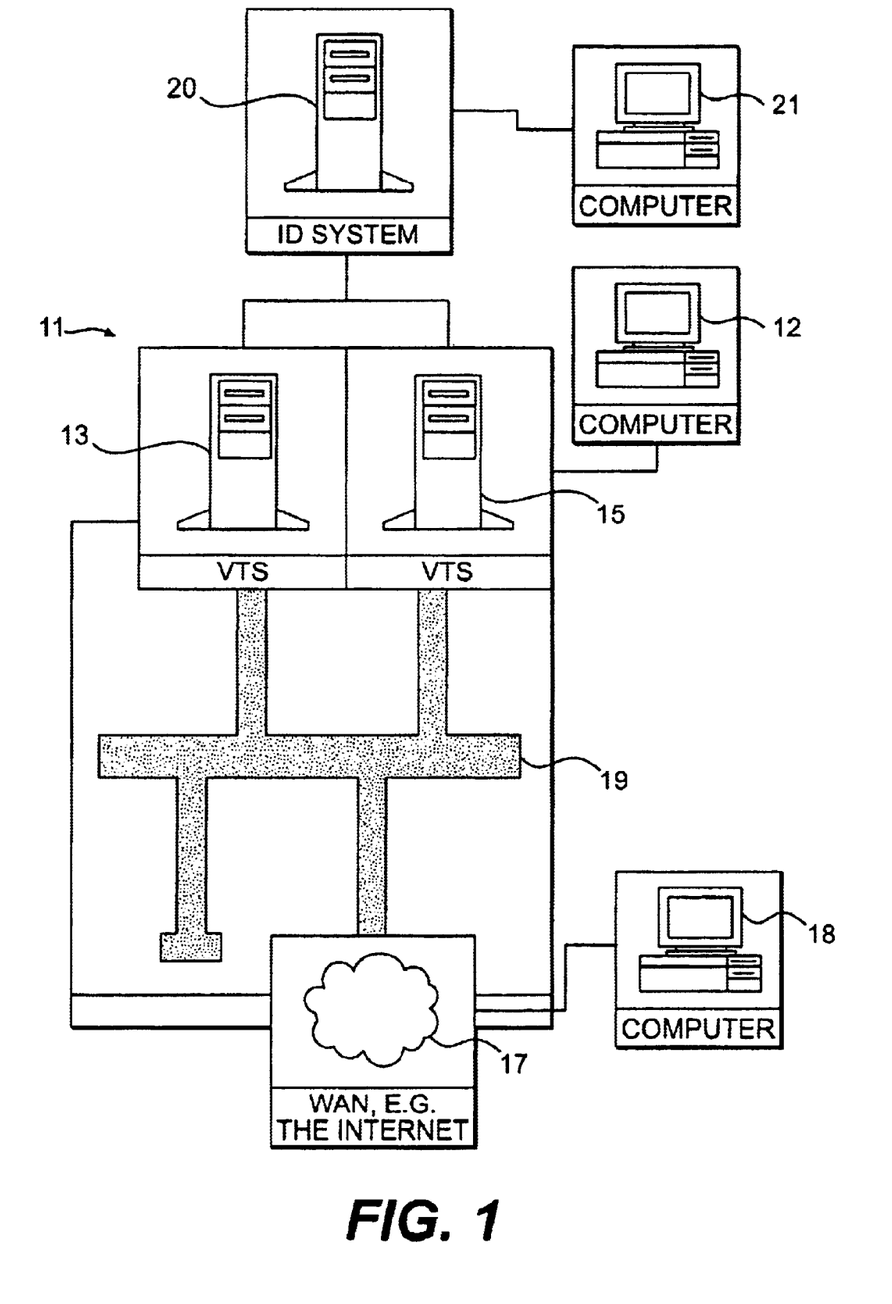
FIG. 1 is a schematic diagram of a preferred embodiment of a WAN-accessible value transfer system according to the invention.
Figure 2:
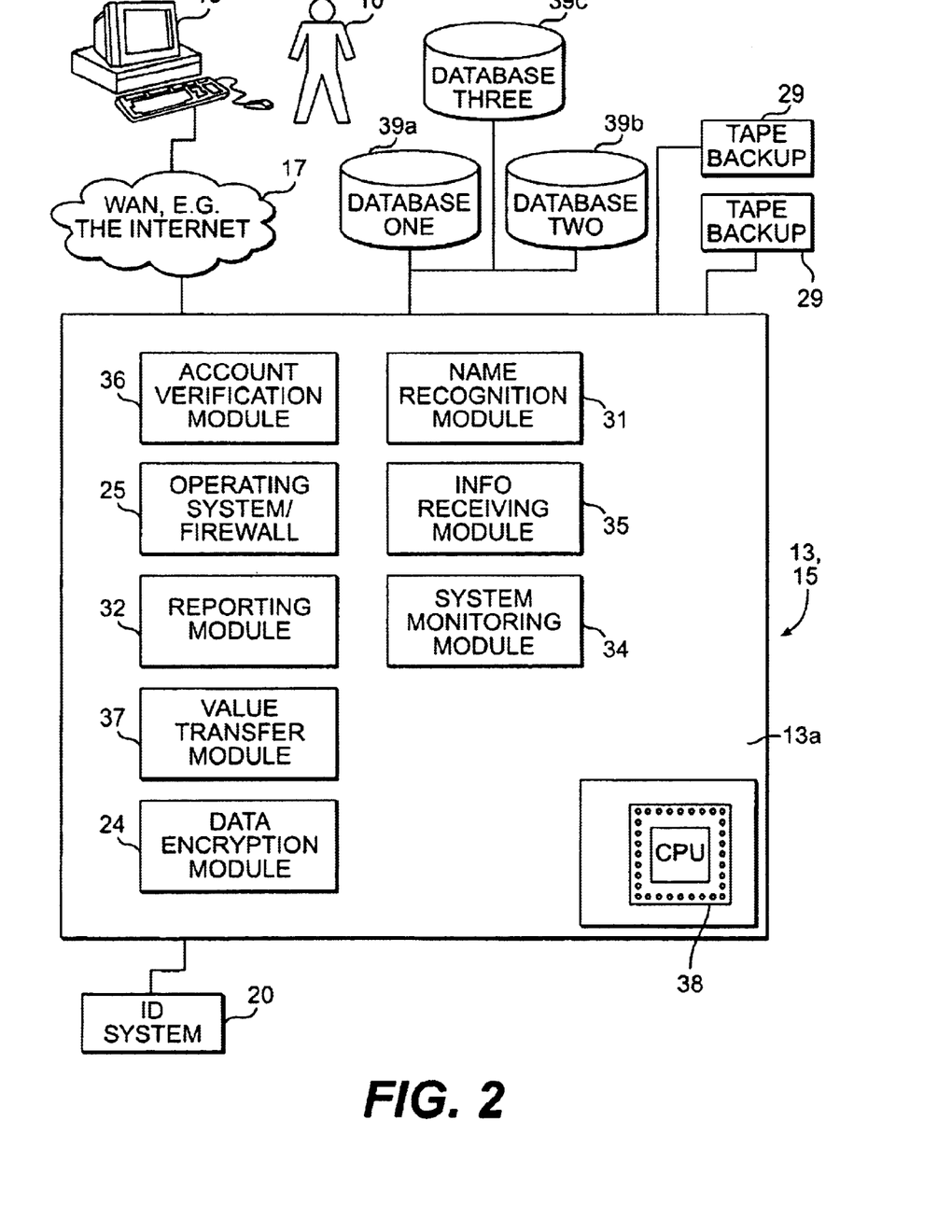
FIG. 2 is a schematic diagram of the value transfer server of FIG. 1.
Figure 9:
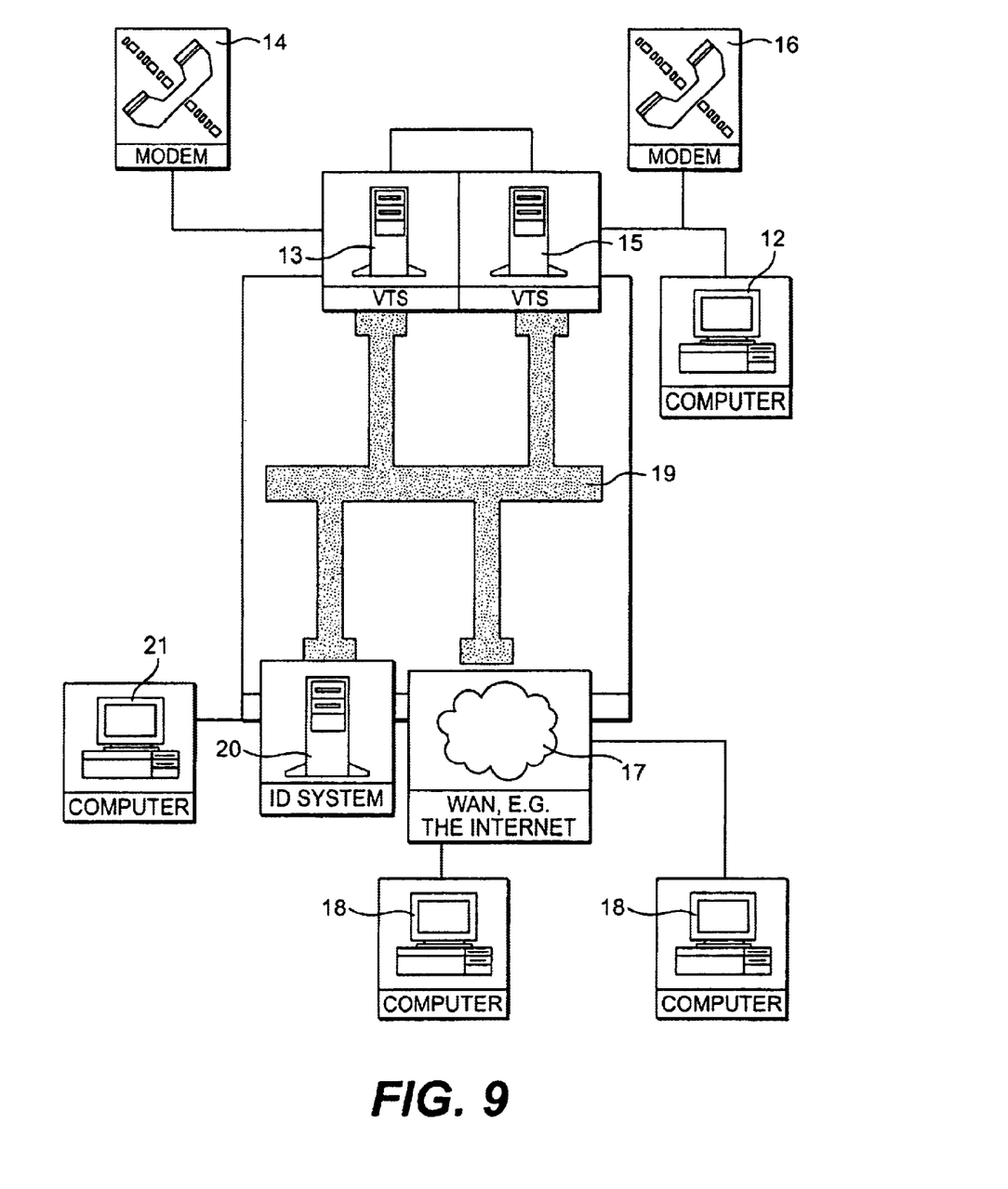
FIG. 9 is schematic diagram of an alternative embodiment of a WAN-accessible value transfer system according to the invention.

The present invention is directed to WAN-accessible systems for allowing an account participant to access an account, e.g., to add value to a first account from a second account. With reference to FIGS. 1, 2, and 9, one embodiment of a WAN-accessible value transfer system according to the invention includes a first account server 20 coupled to a WAN, e.g., the Internet 17. A WAN-accessible VTS 11 is coupled to the WAN 17 and to the first account server 20. In a preferred embodiment, the first account server 20 is coupled to the WAN 17 through the WAN-accessible VTS 11.

A preferred embodiment of the WAN-accessible VTS 11 includes two servers 13, 15. A preferred embodiment of a WAN-accessible VTS includes a central processing unit 38 connected to a memory unit 13a. The memory unit 13a includes an operating system 25 and a plurality of modules including an information receiving module 35, an account verification module 36, and a value transfer module 37. The operating system 25 can be Debian GNU/Linux.

The information receiving module 35 receives information from a participant via the network. The information includes a) a second account identification number, and b) a value that the participant desires to transfer to the second account from the first account. The account verification module 36 receives the second account identification number from the information receiving module and verifies that the second account authorizes the transfer of the specified value. The value transfer module 37 then transfers the specified value from the second account to the first account if authorization is received from the account verification module 36.

Thus, a participant or user 10 can remotely add value to a first account, e.g., to a student identification system account, from a second account, e.g., a credit card account. The user 10 can add value from a computer 18, e.g., a remote computer, via a WAN, e.g., via the Internet.

The value station server 13, 15 can include a variety of other modules including data encryption 24, name recognition 31, reporting 32, and system monitoring 34 modules. In addition, the VTS server includes databases 39a, 39b, 39c. These databases store transaction, reporting, and system monitoring information. Preferably, the system includes a backup system, e.g., backup tape drives 29.

Operating systems, such as windows, typically do not include firewall protection. Thus, firewall software is added on top of the operating system. The layering of firewall software on top of the operating system reduces the speed and reliability of the resulting system. As noted above, according to a preferred embodiment, the operating system 25 can be Debian GNU/Linux. Firewall software is integrated into the Linux operating system kernel, providing low-level integration. The low-level integration provides a fast and reliable network solution, without extra software packages that can fail or be dismantled In addition, a preferred embodiment of firewall software is configured not to respond to any network traffic that is not specifically designated for the web-server. Computer hackers can begin an attack on an Internet-accessible system by initiating communication with the system's server. For example, the hacker can send a request to a system server asking for the addresses of all the computers on the network. A preferred embodiment of a WAN-accessible value transfer system will not respond to such a request. Thus, the hacker is unable to identify the server or any of the transmission control protocol (TCP), user datagram protocol (UDP), or Internet control message protocol (ICMP) openings, making the server invisible to the hacker.

The firewall software also protects against advanced attacks such as IP spoofing and denial of service attacks, e.g., SYN flooding (flooding the server with so much information that the server can not respond). According to one type of denial of service attack, a hacker can submit an overwhelmingly large series of requests to the target server. One method for protecting against such an attack is to require interactive communication on the first request in the series before responding to other requests in the series.

According to a preferred embodiment, the data encryption module 24 posts account information only to Secure Socket Layer (SSL) encrypted pages, so that sensitive information remains private and unknown to attackers listening on the network. In addition, the system can require a participant to complete the transaction within a pre-selected period of time. Thus account holders can safely use a WAN-accessible value transfer system at public kiosks and computer labs without having to worry about their information being retrieved by subsequent users. Furthermore, a preferred embodiment of the system will not allow a participant to submit the exact same transaction twice within a pre-selected period of time. Thus, the system helps to prevent cardholders from submitting duplicate transactions.

The reporting module 32 contains a number of reporting features to help account system administrators track transactions and cardholder usage. The report interface can be HTML based, providing a simple interface for account system administration staff. Reports are secured via SSL so that report information is confidential between the server and client. The reports can be customized to provide a variety of information including sales, time of day usage, length of usage, and site navigation information. The reports can also include verification information such as individual customer IP addresses.

Figure 3:
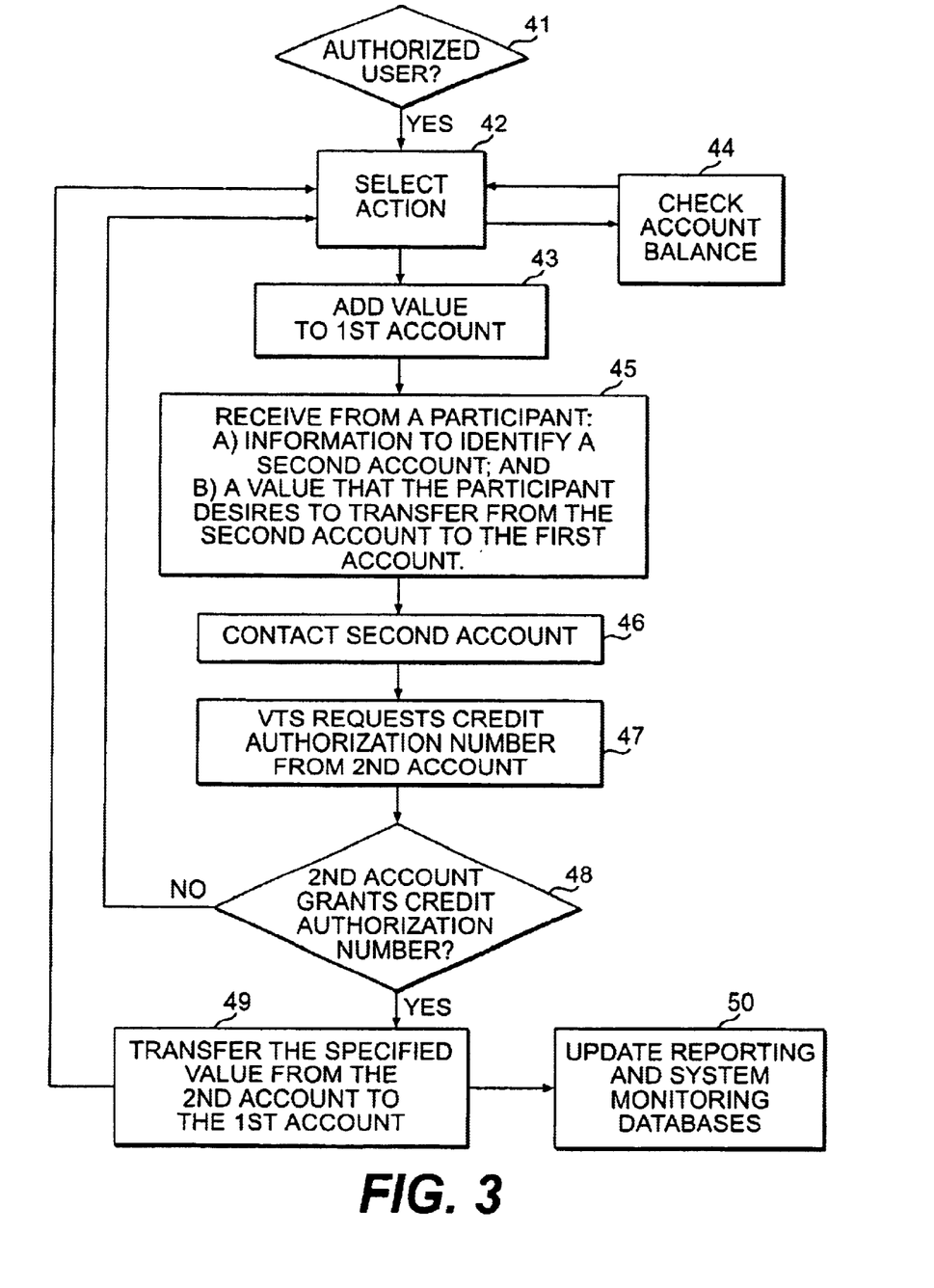
FIG. 3 is a flow chart for one embodiment of the operation of the WAN-accessible value transfer system of FIG. 1.

With reference to FIG. 3, in operation, a preferred embodiment of the invention performs the following steps. The WAN-accessible value transfer system determines 41 whether the user is authorized to access the first account, e.g., a university identification system. If the user is authorized, the user is allowed to select an action 42 including checking an account balance 44 or adding value to a first account 43. If the user decides to add value to an account, the system receives 45 from the user or participant, a) information to identify a second account, e.g., a credit card number, and b) a value that the participant desires to transfer from the second account to the first account. The system then contacts 46 the second account and requests 47 a credit authorization number from the second account. If the second account grants 48 a credit authorization number, then the system transfers 49 the specified value from the second account to the first account. Otherwise, the system can return the user to a web page that informs the user that the transaction was not authorized and again requests the user to select an action. Optionally, the system can then update 50 ancillary databases, e.g., the reporting and system monitoring databases, regarding the transaction.

Figure 4:
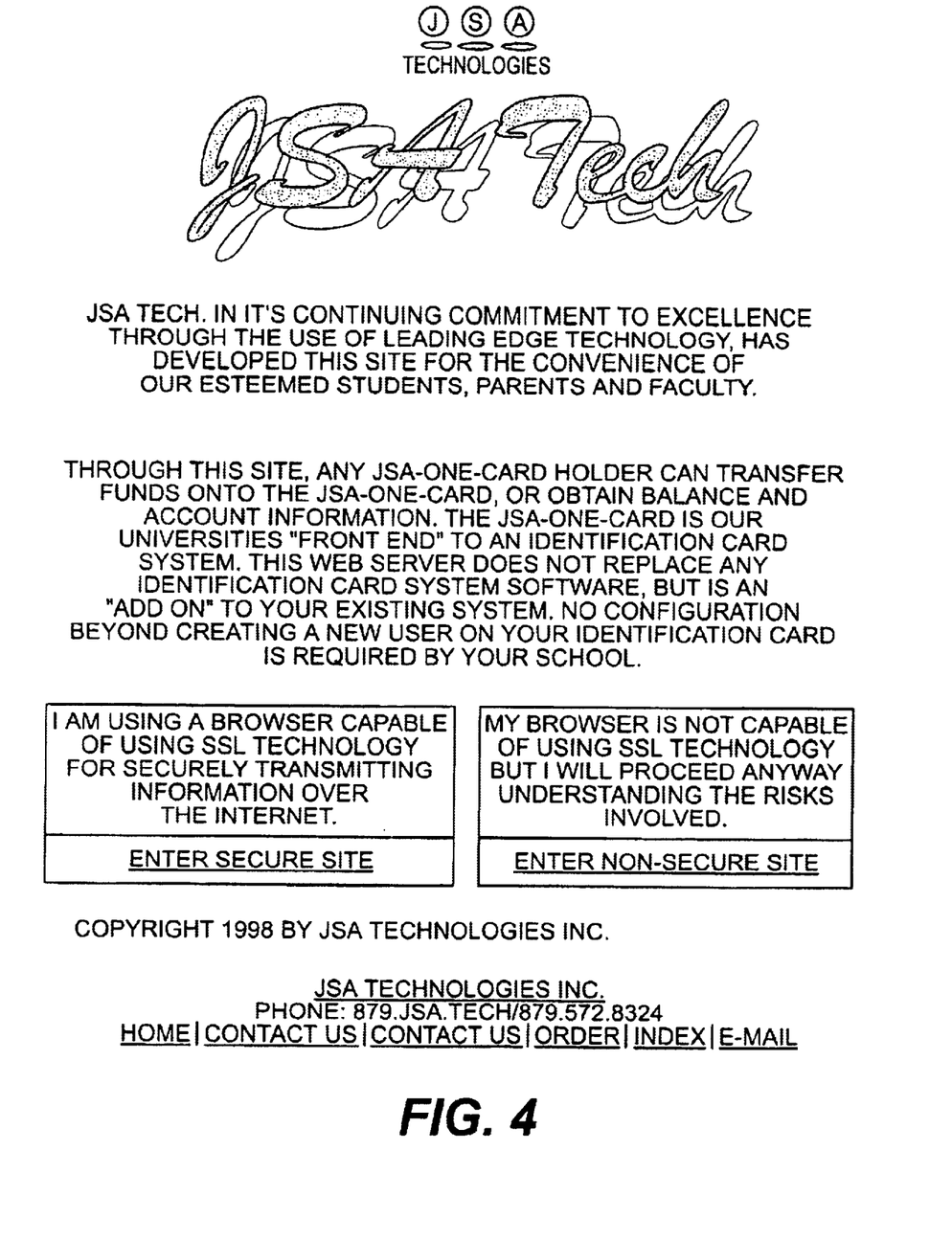
FIG. 4 is one embodiment of a home page for the web site of the WAN-accessible value transfer system of FIG. 1.
Figure 5:
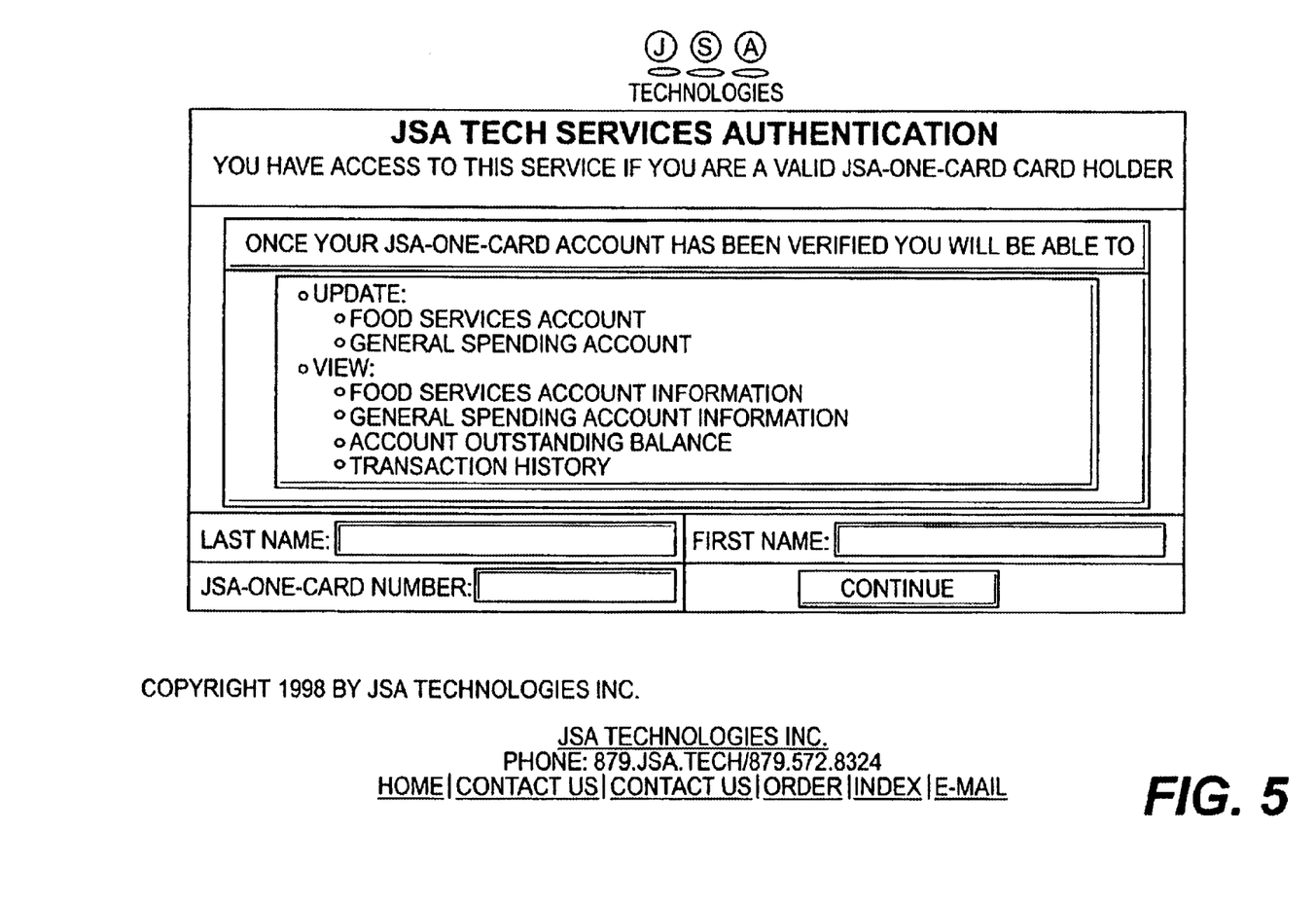
FIG. 5 is one embodiment of a login or access screen for the web site of the WAN-accessible value transfer system of FIG. 1.

With reference to FIGS. 4–8, a preferred embodiment of a WAN-accessible value transfer system provides a web site with a variety of web pages. With reference to FIG. 4, the home page of the WAN-accessible VTS web site can inform the user of the general character of the WAN-accessible VTS and of the level of security possible given the user's computer system. If the user decides to continue, the user comes to an HTML form page, as shown in FIG. 5, for logging in to the system.

Figure 6:
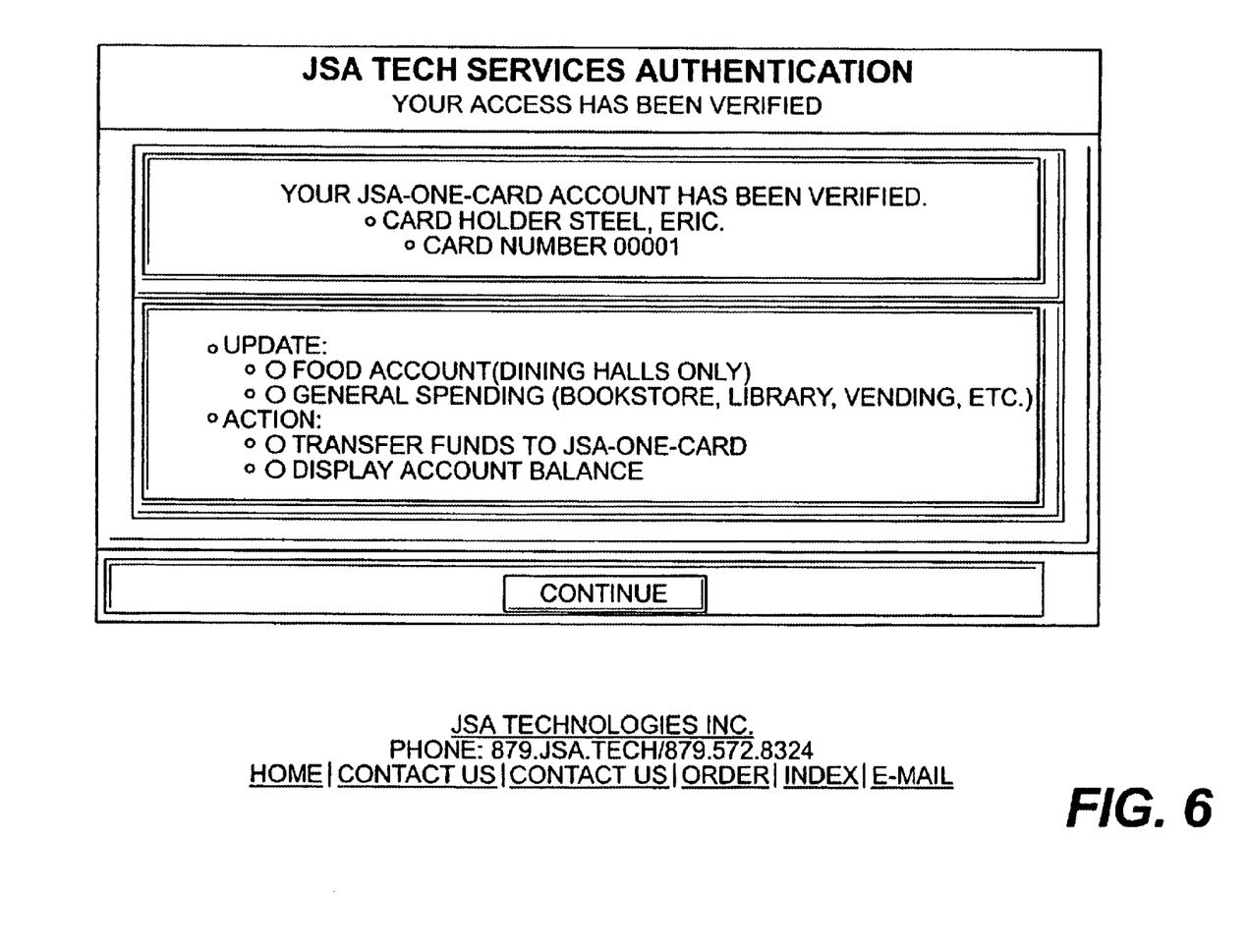
FIG. 6 is one embodiment of a main menu screen for the web site of the WAN-accessible value transfer system of FIG. 1.
Figure 7:
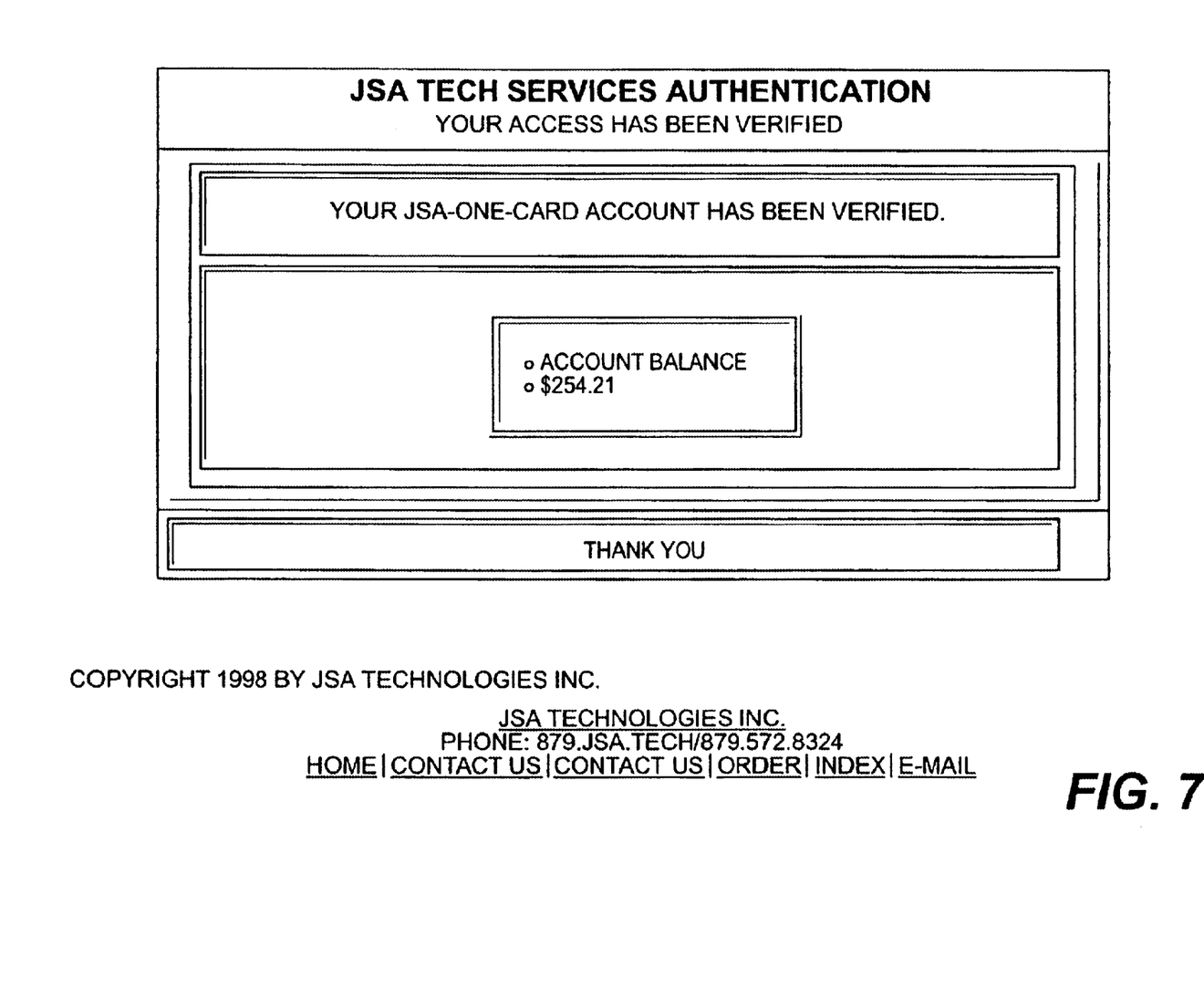
FIG. 7 is one embodiment of a first account balance screen for the web site of the WAN-accessible value transfer system of FIG. 1.

Once the user has successfully logged in, the user comes to a web page, as shown in FIG. 6, providing a variety of possible actions, e.g., check an account balance or transfer funds into the account, that the user can perform within the system. If the user decides to check on the first account balance, the user comes to a web page, as shown in FIG. 7, providing a first account balance.

Figure 8:
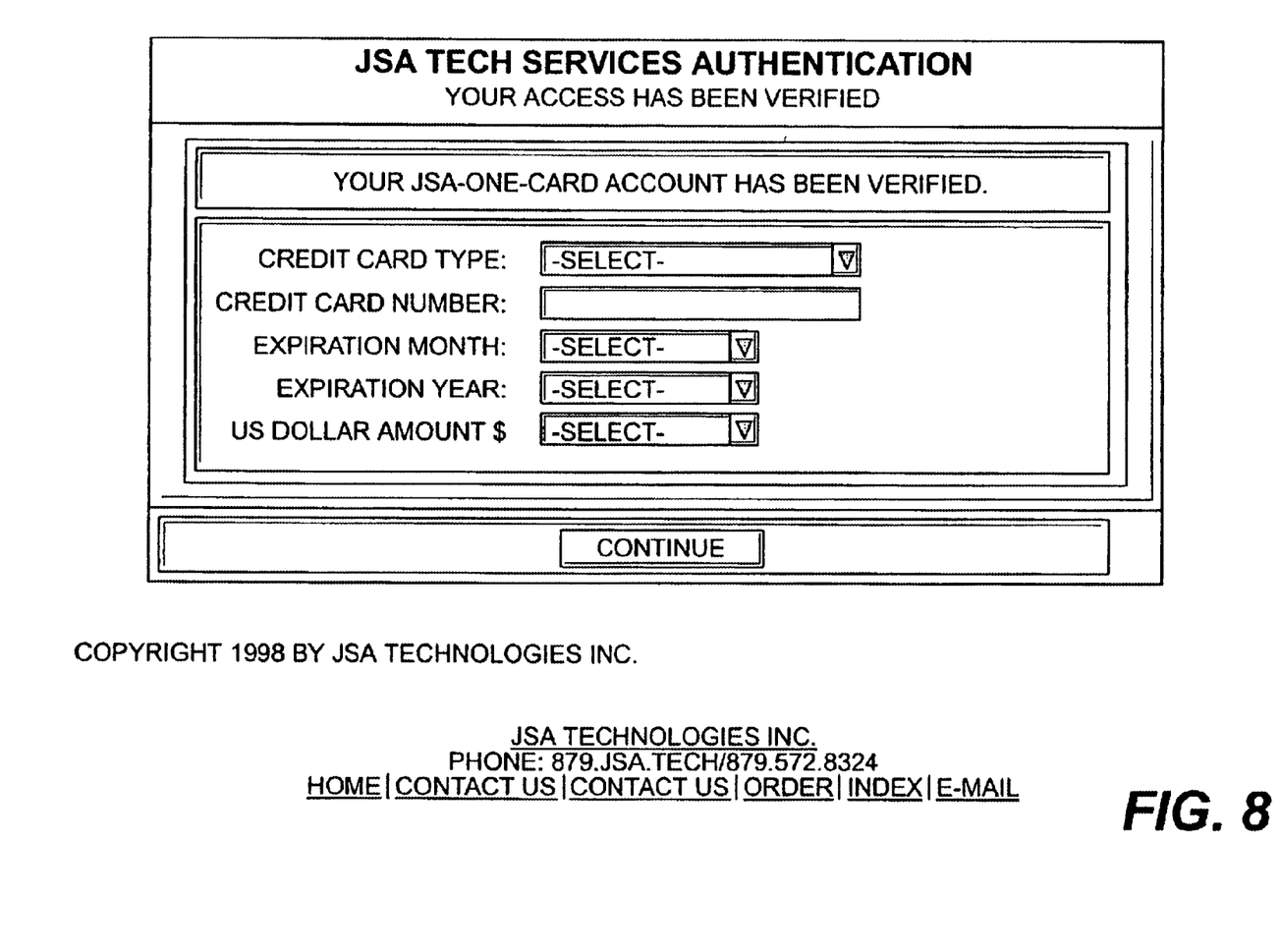
FIG. 8 is one embodiment of a second account information input screen for the web site of the WAN-accessible value transfer system of FIG. 1.

If the user decides to transfer funds from a second account to a first account, the user comes to a web page, as shown in FIG. 8, providing several fields, including some with selection menus, that the user completes. The fields relate to the second account and to the amount of funds that the user would like to transfer.

More generally, the VTS web site provides cardholders unlimited viewing of their transactions and current balances. By providing cardholders access to their account information, institutions, e.g., universities, eliminate the need to mail costly paper versions of monthly statements. Currently, if an organization runs a debit card system, that organization is classified under U.S. banking regulations in which they must provide statements to all cardholders. Statements have traditionally been provided by printing and mailing statements to all cardholders, which can be costly, difficult, and error prone. The VTS web site eliminates the need for printed statements, and thus reduces the costs of postage and labor associated with the traditional paper reporting methods. Using the VTS web site also reduces the need to answer cardholder inquiries regarding balances and account transactions.

It will thus be seen that the objects set forth above, among those made apparent from the preceding description, are officially attained. Since certain changes may be made in the above constructions without departing from the scope of the invention, it is intended that all matter contained in the above description and shown in the accompanying drawings be interpreted as illustrative and not in a limiting sense.

It is also to be understood that the following claims are intended to cover all generic and specific features of the invention described therein, and all statements of the scope of the invention which as a matter of language might be the to fall therebetween.

What is claimed is:

1. A system for allowing a user to add a value via a wide-area network (WAN) to a first account of a first network system of a participant from a second account supported by a different network system, the first account being supported by a first account server coupled to the WAN, said value-adding system comprising:

a WAN-accessible value transfer station (VTS) coupled to said WAN and coupled to the first account server, said WAN-accessible VTS including 1) means for receiving from one of a general purpose computer and a personal digital assistant (PDA) operated by the user a) second account identification information, and b) the value that the user desires to transfer to said first account from said second account, 2) means for verifying that said second account authorizes the transfer of said value, and 3) means for transferring said value to said first account from said second account.

2. The system according to claim 1, wherein said WAN-accessible VTS comprises a central processing unit for executing instructions, a memory unit comprising an operating system, software for receiving from the user via the WAN a) second account identification information, and b) the value that the user desires to transfer to said first account from said second account, second account verification software for receiving the second account identification information from said receiving software and for verifying that the second account authorizes the transfer of said value, and value transfer software for receiving the value from said receiving software, for receiving a verification from said verification software, and for transferring said value to said first account from said second account if said verification is received, and conductive interconnects connecting said central processing unit and said memory unit to allow portions of the WAN-accessible VTS to communicate and to allow the central processing unit to execute the software in the memory unit.

3. The system according to claim 2, wherein said memory unit further comprises firewall software for providing security for the system.

4. The system according to claim 3, wherein said operating system comprises an operating system kernel and wherein said firewall software is integrated into the operating system kernel.

5. The system according to claim 2, wherein said memory unit further comprises security socket layer data encryption software for encrypting data for transfer outside of said system.

6. The system according to claim 2, wherein said receiving software further comprises software for receiving first account identification information.

7. The system according to claim 2, wherein said memory unit further comprises name recognition software for receiving first account identification information and for matching a name associated with the first account identification information with the name of the participant.

8. The system according to claim 2, wherein said memory unit further comprises
   system monitoring software for monitoring the system.

9. The system according to claim 8, wherein said system further comprises
   means for emitting sound to report system status, said means being controlled by said system monitoring software.

10. The system according to claim 2, wherein said system further comprises
    small computer system interface (SCSI) drives connected to said central processing unit.

11. The system according to claim 2, wherein said system further comprises
    backup drives coupled to said central processing unit.

12. The system according to claim 2, wherein said system further comprises at least one uninterruptable power supply coupled to said WAN-accessible VTS server.

13. The system according to claim 1, wherein said first account is a student identification card account.

14. The system according to claim 1, wherein said second account is selected from the group of accounts consisting of debit accounts and credit card accounts.

15. The system according to claim 1, wherein said first account server is coupled to the WAN through said WAN-accessible value transfer station.

16. The system according to claim 1, wherein the system further comprises a second WAN-accessible value transfer station.

17. In a server, a method of adding a value to a first account supported by a first computer network by transferring value from a second account supported by a second computer network different from the first computer network, the method comprising the steps of:
    receiving from one of a general purpose computer and a personal digital assistant (PDA) operated by a user via a wide-area network a) second account identification information for identifying the second account, and b) the value that the user desires to transfer to said first account from said second account,
    verifying that said second account authorizes the transfer of said value, and
    transferring said value to said first account from said second account.

18. The method of claim 17, wherein said receiving step further comprises receiving from the user first account identification information for identifying said first account of an account participant.

19. The method of claim 18, wherein said method further includes the step of receiving said account participant's name.

20. The method of claim 19, wherein said method further includes the step of confirming that said first account identification information is associated with the name of the account participant.

21. A computer data signal embodied in a carrier wave comprising
    program code which allows for a card account participant or authorized user to use the Internet to add value to a first account from a second account, the first account being supported by a first account server coupled to the Internet, the first and second accounts being supported by different computer networks, said program code including
    software for receiving from the participant or user a) first account identification information, b) second account identification information, and c) the value that the participant desires to transfer to said first account from said second account,
    second account verification software for verifying that the second account authorizes the transfer of said value, and
    value transfer software for transferring said value to said first account from said second account.

22. The computer data signal of claim 21, wherein the software for receiving from the participant first account identification information, second account information, and value includes software for receiving said first account information, said second account information, and said value from a device connected to the Internet.

23. The computer data signal of claim 22, wherein the device connected to the Internet includes one of a general purpose computer and a personal digital assistant (PDA).

24. The system of claim 1, wherein said WAN is a non-proprietary network.

25. The system of claim 1, wherein the first network system is a card account system.

26. The system of claim 1, wherein the different network system includes a financial network system.

27. The system of claim 1, wherein the user and the participant is the same person.

28. The system of claim 1, wherein said receiving means receives said second account information and said value at a Web site.

29. The system of claim 1, wherein access to the value transferred to said first account from said second account occurs instantaneously after the system receives the second account information and value that the user desires to transfer.

* * * * *